Feb. 20, 1962   D. M. KING   3,021,718
CHAINS FOR USE IN CONVEYOR SYSTEMS
Filed June 2, 1960

3,021,718
CHAINS FOR USE IN CONVEYOR SYSTEMS
Donald Mayer King, % Argyle Works, Stevenage,
Hertfordshire, England
Filed June 2, 1960, Ser. No. 33,581
Claims priority, application Great Britain June 4, 1959
2 Claims. (Cl. 74—254)

This invention relates to chains for use in conveyor systems and more particularly to chains of the kind made up of a succession of substantially flat links interconnected by means of connecting pins.

In chains of the kind indicated it is common practice to alternate along the length of the chain so-called inner and outer links, the outer links each comprising a pair of identical link elements which are disposed in spaced parallel relation and which accommodate between them the end portions of the adjoining inner links. Each of the inner links may be constituted by a single element or a pair of similar elements disposed one on the other. For an example of a chain of the general kind to which the invention relates reference may be made to the specification of my prior British Patent No. 713,447.

According to the invention a chain is provided wherein each outer link comprises a pair of identical link elements each in the form of an elongated closed loop. A keeper plate is provided for each such link element, said keeper plates being adapted to be applied to respective link elements during assembly of the chain and, on extension of the chain, to positively maintain the connecting pins against undesired displacement. Each keeper plate is formed so that it engages in slots or recesses in the connecting pins and will on extension of the chain, be positively located with respect to the link element to which it corresponds.

Figure 1:
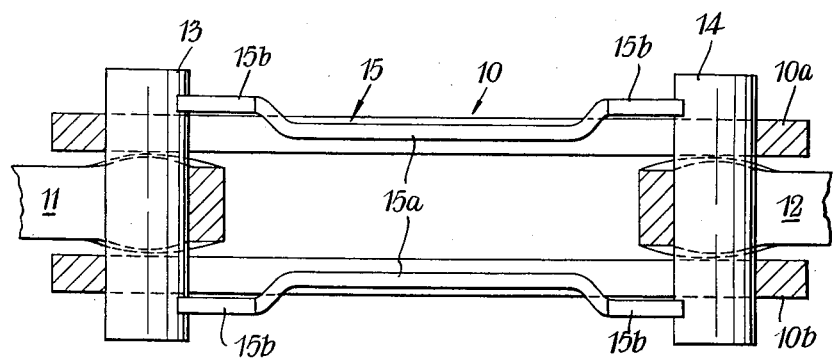
Figure 2:
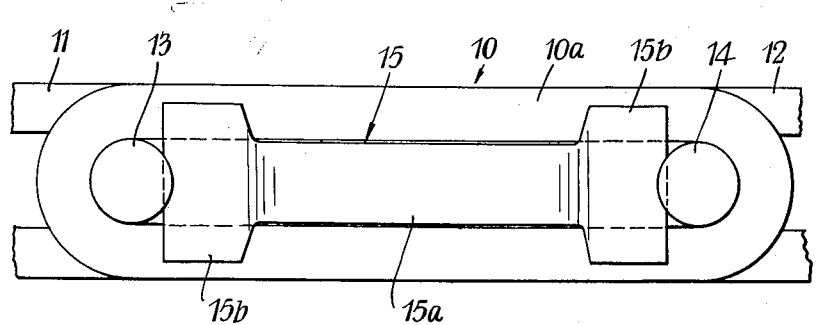

In order that the invention may be clearly understood and readily carried into effect the same will be hereinafter more fully described with reference to the accompanying drawings in which:

FIGURE 1 shows a side elevation of a portion of a conveyor chain partly in section, FIGURE 2 is a plan view of the assembly shown in FIGURE 1.

Referring to the drawings, 10 generally denotes an outer link, which consists of two identical link elements 10a and 10b each in the form of an elongated closed loop. The link elements may each comprise integral or one piece units produced from a metal plate or strip but preferably each will be constituted by two lengths of metal wire, rod or strip bent to a substantially U or J shape, the U or J shaped pieces being then appropriately butted together to form the elongated closed loop and then butt welded to produce the finished link element. 11 and 12 denote two inner links each of which will preferably be formed in the manner described in the specification of my British Patent No. 869,746. However, said inner links may, in accordance with previously known practice, each comprise two identical link elements which are so formed that when disposed one on the other each such inner link will incorporate end portions of universal thickness. The inner links 11 and 12 are coupled to the outer link by means of connecting pins 13 and 14, the pins being maintained in their operative positions by means of keeper plates 15. As will be seen from the drawings each keeper plate is formed with a dished center portion 15a and enlarged end portions 15b which latter portions are adapted to be engaged in slots or recesses in the pins 13 and 14. The arrangement is such that when the links are assembled the enlarged end portions of the plates 15 will overlie their respective outer link elements and therefore prevent undesired displacement of the pins 13 and 14 in the axial direction of the pins while the plates themselves will be retained against lateral displacement such as would result in disconnection from the pins by virtue of the fact that the central dished portions 15a thereof are actually positioned and engaged within the space defined by the closed loop of the respective link elements.

During assembly of the chain the two outer link elements 10a and 10b are appropriately disposed one above and one below the center portions of the adjacent inner links 11, 12 and the connecting pins 13, 14 are inserted. Due to the fact that the central portions of the inner links are of decreased thickness in relation to the end portions, the various parts may be relatively so disposed that the slots or recesses in the pins will be exposed sufficiently to allow the keeper plates 15 to be engaged therein. Upon extension of the links into the position shown in FIGURE 1 the outer link elements 10a and 10b will be forced apart by the portions of increased thickness at the ends of the inner links 11 and 12 so that the dished central portions 15a of said keeper plates will then be engaged in their respective outer link elements.

It will be appreciated that keeper plates such as are indicated above will serve to strengthen the outer links. In addition plain pins may be used as opposed to the headed type of pins hitherto generally employed in this type of chain and it may be pointed out that the formation of such slots or recesses as are necessary in the pins will not adversely affect the strength thereof since shear strength is not the criterion.

What is claimed is:

1. A chain comprising a plurality of longitudinally spaced inner links each having opposite ends, a pair of outer links extending between and overlapping the ends of adjacent inner links, each of said outer links having an elongated opening therein, each inner link being provided with an opening adjacent each of said ends, a connecting pin extending through aligned openings of the inner links and outer links, each connecting pin being provided with at least one slot, and a rigid keeper plate in part in the elongated opening of said outer links and engageable in one of the slots of adjacent connecting pins whereby said keeper plate prevents displacement of said pins.

2. A chain as claimed in claim 1 wherein the keeper plate includes a dished central portion in the elongated opening of the outer link and enlarged end portions straddling the elongated opening, said end portions being engaged in said slots in the connecting pins.

References Cited in the file of this patent
UNITED STATES PATENTS
2,860,520     Sull _____ Nov. 18, 1958
FOREIGN PATENTS
27,253     Great Britain _____ of 1896